Jan. 3, 1939. R. J. OLANDER 2,142,256
HAND BRAKE
Filed Aug. 24, 1936 2 Sheets-Sheet 1
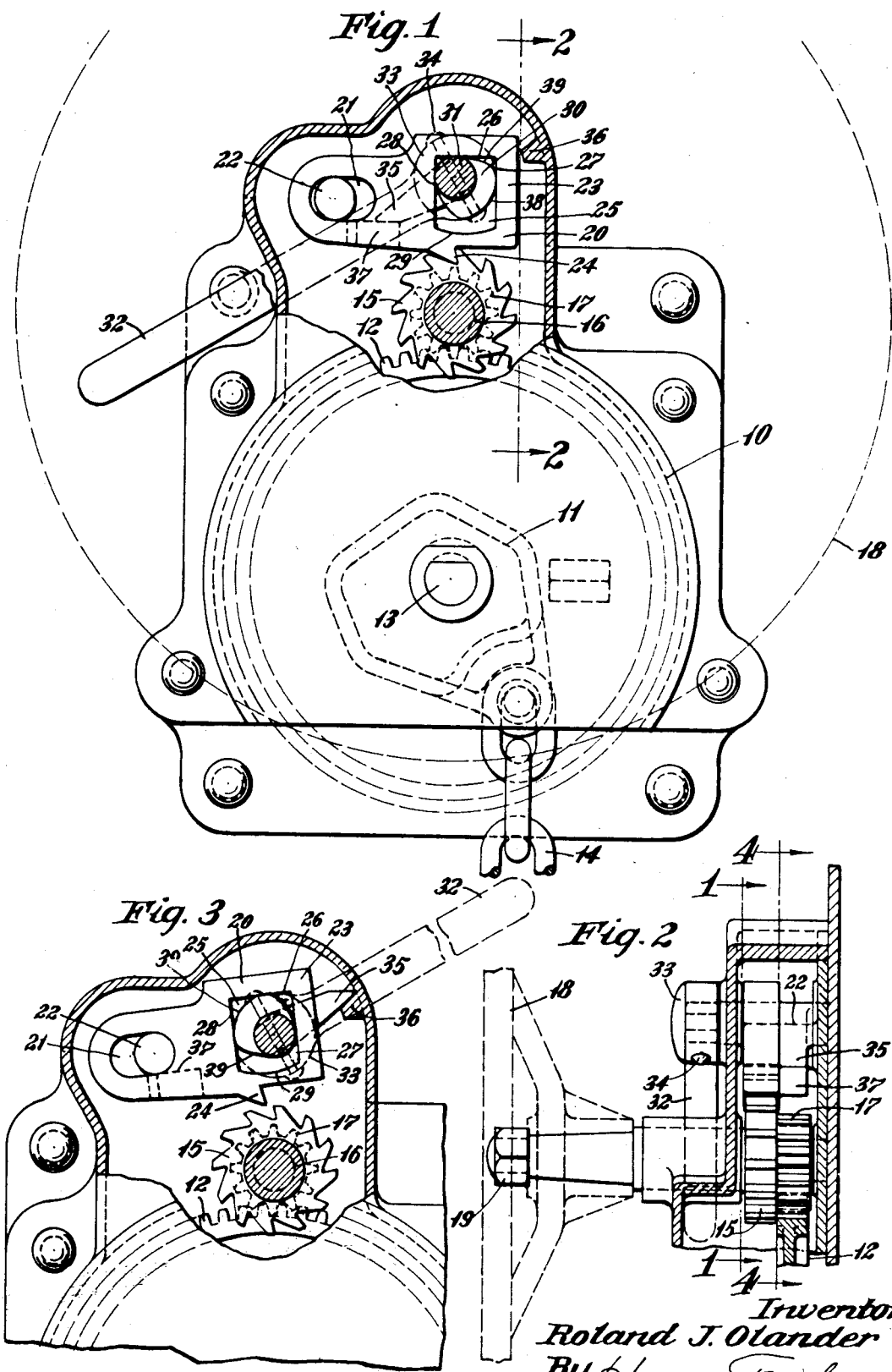
Inventor
Roland J. Olander
By Henry Fuchs
Atty.

Jan. 3, 1939. R. J. OLANDER 2,142,256

HAND BRAKE

Filed Aug. 24, 1936 2 Sheets-Sheet 2

Inventor
Roland J. Olander
By Henry Fuchs
Atty.

Patented Jan. 3, 1939

2,142,256

UNITED STATES PATENT OFFICE 2,142,256

HAND BRAKE

Roland J. Olander, Chicago, Ill., assignor to W. H. Miner, Inc., Chicago, Ill., a corporation of Delaware Application August 24, 1936, Serial No. 97,537

14 Claims. (Cl. 74—505)

This invention relates to hand brakes for railway cars, and more particularly to means for locking the brake mechanism against release when the brakes are applied, and effecting gradual back off and quick release of said mechanism when desired.

One object of the invention is to provide in a hand brake mechanism of the ratchet type, means for holding the mechanism in tightened condition when the brakes are applied, wherein the holding means is further employed to effect gradual backing off of the brakes and quick and complete release when desired.

A more specific object of the invention is to provide in a ratchet hand brake a locking pawl which is manually operated to engage with the cooperating ratchet mechanism of the brakes to hold the brake mechanism against release, wherein the pawl may be moved in one direction while in engagement with the ratchet means to control movement of said ratchet means in brake releasing direction so as to permit easing off or backing up of the brakes.

A still further object of the invention is to provide a locking pawl of the character described in the preceding paragraph which is completely disengaged from the ratchet means to quickly release the brakes, wherein the complete release is effected after a certain amount of backing off of the brake mechanism, thereby facilitating disengagement of said pawl by relieving the pressure on the same while it is being disengaged from the ratchet means.

Other objects of the invention will more clearly appear from the description and claims hereinafter following.

Figure 4:
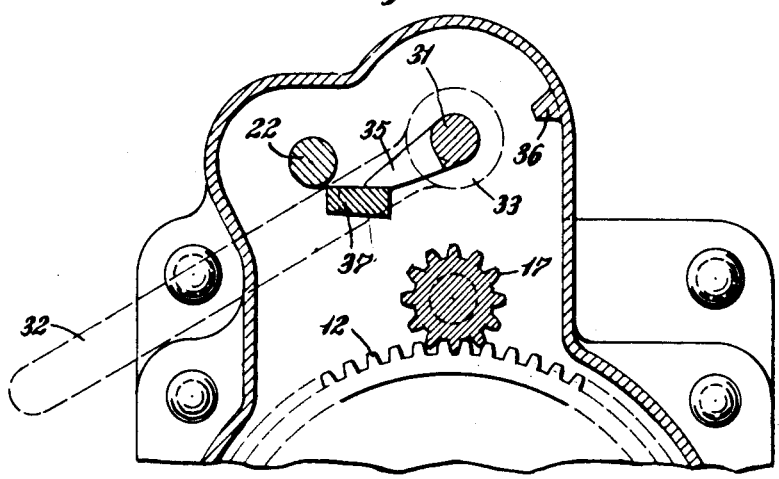
Figure 5:
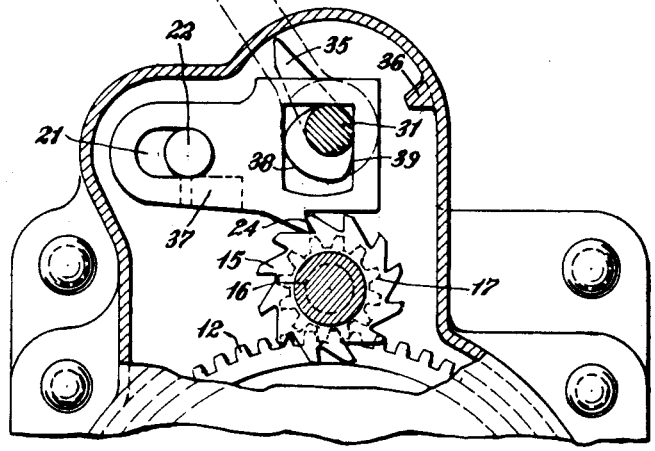

In the drawings forming a part of this specification, Figure 1 is a front elevational and part vertical sectional view of a hand brake mechanism, illustrating my improvements in connection therewith, said view showing the brake mechanism in the position which it occupies when mounted on the end wall of a car, the usual hand wheel being indicated in dotted lines. Figure 2 is a vertical sectional view, corresponding substantially to the line 2—2 of Figure 1. Figure 3 is a view similar to Figure 1, partly broken away, showing the parts in a different position. Figure 4 is a vertical sectional view, corresponding to the line 4—4 of Figure 2. Figure 5 is a view similar to Figure 3, showing the parts in another position.

In said drawings, 10 indicates a housing which encloses the parts of the hand brake mechanism. The housing is secured to the vertical end wall of the car and comprises a relatively large portion which contains the usual chain winding drum 11 and driving gear 12. The upper portion of the housing 10, which is of reduced size with respect to the lower portion which contains the drum 11 and the driving gear 12 serves to house the ratchet mechanism. The winding drum 11 has the driving gear 12 fixed thereto so that the drum and gear will rotate in unison. A shaft 13, journaled in the front and rear walls of the lower portion of the housing 10, rotatably carries the drum 11 and the gear 12. The drum 11 has the usual chain 14 anchored thereto, the bottom of the housing 10 being open to permit free movement of the chain. As will be understood, the chain 14 leads to the brake mechanism proper of the car and actuates the brake shoes in the usual manner when the chain 14 is wound on the drum.

The ratchet mechanism includes a ratchet wheel 15 fixed to a short shaft 16 having its opposite ends journaled in the front and rear walls of the reduced upper portion of the housing 10. The shaft 16 has a pinion 17 fixed thereto, the pinion 17 meshing with the gear 12. The front end of the shaft 16 projects outwardly of the housing and has a hand wheel 18, of well-known type, secured thereto. The hub of the hand wheel 18 is preferably provided with a tapered socket of angular cross section in which the outer end of the shaft 16 fits, said end of the shaft being of similar cross section and correspondingly tapered to the socket. To hold the hand wheel 18 in place, the extremity of the shaft 16 is provided with a securing nut 19 which bears on the outer end of the hub of the hand wheel. As will be evident, when the hand wheel is rotated in either direction the shaft 16 will be rotated therewith, thereby rotating the ratchet wheel 15 and the pinion 17. Inasmuch as the pinion 17 meshes with the gear 12, the gear will be rotated in a reverse direction to the direction of rotation of the pinion, thus rotating the drum 11 to either wind the chain thereon or unwind the same therefrom, depending upon the direction of rotation of the hand wheel 18.

A locking dog or pawl 20 cooperates with the ratchet wheel 15. The locking dog or pawl 20 is of the shape shown in Figures 1, 3, and 5, and has a slot 21 at the left hand end, as viewed in said figures. The slot 21 is disposed substantially horizontally. The pawl 20 is pivotally supported above the ratchet wheel 18 by a horizontally disposed pivot pin 22, extending through the slot 21, the pin being in the form of a stud on the rear wall of the reduced upper portion of the housing 10. As will be evident, the slotted arrangement of the pivot opening 21 of the pawl 20 provides for sliding and pivotal or rotary movement of the pawl. The end of the pawl 20 remote from the pivot thereof is enlarged, as indicated at 23, said enlarged portion being disposed directly above the ratchet wheel 15 and having a depending tooth member 24 adapted to engage with the teeth of said ratchet wheel 15.

The enlarged portion 23 of the pawl 20 has an opening 25 therethrough, said opening being of the outline most clearly shown in Figures 1, 3, and 5. The top and side walls of said opening are substantially straight and are disposed at approximately right angles to each other, the top wall being indicated by 26, the right hand side wall by 27, and the left hand side wall by 28. The bottom wall of the opening, which is indicated by 29, is downwardly curved as shown for a purpose hereinafter pointed out. The enlarged portion 23 of the pawl 20 is, in effect, in the form of a yoke member.

The pawl 20 is operated and controlled by a cam member 30 working in the opening 25 of the pawl. The cam member 30 is fixed to a short shaft 31 having its opposite ends journaled in the front and rear walls of the housing 10 above the shaft 16. The front end of the shaft 31 projects through and beyond the front wall of the housing 10 and has an operating handle lever 32 fixed to said projecting end. The operating handle 32 has a hub portion 33 within which the outer end of the shaft 31 fits, and the handle is secured to said shaft by means of a pin 34, or any other well-known similar securing element, extending through said hub and shaft. The cam shaft 31 is also provided with a stop finger 35, which is fixed to said shaft and which may be formed integral with the cam 30. The finger 35 is disposed in back of the cam member 30, as clearly shown in Figures 2 and 4, and is adapted to engage with a stop lug 36 on the housing 10 to limit movement of the operating lever 32 and cam 30 in one direction. The finger 35 also cooperates with a laterally projecting, horizontally disposed, stop flange 37 on the rear side of the pawl 20, said stop flange 37 being located at the pivoted end of said pawl, as shown in Figures 1, 3, 4, and 5. The cam member 30 has a high portion, which is indicated by 38, and a low portion, which is indicated by 39.

In the normal ratcheting position of the brake mechanism, the cam actuating lever or handle 32 is in the position shown in Figure 1, the finger 35 bearing on the flange 37 of the pawl 20. As will be evident, the weight of the lever 32 thus causes the finger 35 to bear on the pawl 20 to urge the latter toward the ratchet wheel 15. The weight of this lever is thus added to the weight of the pawl to hold the latter in ratcheting relation with respect to the ratchet wheel 15.

Upon reference to Figures 1 and 5, it will be seen that the opening 25 of the pawl 20 is of sufficient height to assure proper clearance between the bottom wall 29 of said opening and the cam 30 to permit the required amount of upward swinging movement of the pawl on its pivot to allow proper ratcheting action of said pawl with respect to the ratchet wheel 15.

In applying the brakes, the cam lever 32 is placed in the position shown in Figure 1, thereby positioning the pawl 20 for ratcheting action. The hand wheel is then turned in a clockwise direction, thereby rotating the shaft 16 and actuating the drum 11 in a contra-clockwise direction through the intermeshing pinion 17 and gear 12. The chain 14 is thus wound on the drum to bring the brake shoes into engagement with the wheels of the car. During this winding action, the pawl 20 ratchets over the teeth of the ratchet wheel 15 and prevents backward rotation of said wheel.

To completely release the brakes, the cam lever 32 is swung from the position shown in Figure 1 to that shown in Figure 3, the cam 30 lifting the pawl entirely clear of the ratchet 15 and permitting the parts to rotate freely and the chain 14 to unwind from the drum. Movement of said handle lever 32 and the cam 30 is positively stopped by engagement of the finger 35 with the stop lug 36 when the parts reach the position shown in Figure 3. The weight of the lever 32, when the latter is in the position shown in Figure 3, maintains the pawl in raised position by holding the cam 30 against rotation.

When it is desired to ease off or back up the brakes, the lever 32 is not swung to the extent shown in Figure 3, but moved from the position shown in Figure 1 to that shown in Figure 5, thereby camming the pawl to the left, as viewed in said last named figures, while the tooth 24 of the pawl remains engaged with the ratchet wheel 15. The ratchet wheel 15 will thus be backed off, thereby effecting a similar backing off action of the brake drum and partially releasing the brake shoes from the wheels. The lever 32 may again be swung back to the position shown in Figure 1, thereby again setting the brakes. As will be evident, the operation of the brakes is thus controlled by swinging or oscillating the lever 32 in the manner just described. The brakes may thus be slightly eased off and reapplied as desired, thereby facilitating the control of the car, especially in switching operations. It is further pointed out that when the lever is swung from the position shown in Figure 1 to that shown in Figure 3, to completely release the brakes, the pawl 20 moves through the position shown in Figure 5 and is thus first eased off before being disengaged from the ratchet wheel, thereby preventing binding of the parts and facilitating the releasing action.

In applying the brakes after the same have been completely released, the lever 32 is thrown from the position shown in Figure 3 to that shown in Figure 1 to reengage the pawl 20 with the ratchet wheel 15 before actuating the hand wheel. In the event that an obstruction, such as snow or ice is impacted between the teeth of the ratchet wheel, which obstruction would prevent the pawl from dropping into place by gravity, the finger 35 engaging with the flange 37 of the pawl 20 positively forces the latter into engagement with the teeth of said ratchet wheel.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a chain winding drum; of means for rotating said drum; a ratchet wheel rotatable with said last named means; a locking pawl cooperating with said ratchet wheel; pivot means on which said pawl is mounted for combined pivotal and sliding movement; a manually operated, reversibly movable cam member in constant engagement with said pawl for sliding said pawl in reverse directions on its pivot and swinging the same with respect to said pivot means when moved in one direction to lift the pawl free of said ratchet wheel; and means movable with said cam and engageable with the pawl to force it into engagement with said ratchet wheel when said cam member is moved in a reverse direction.

2. In a hand brake mechanism, the combination with a chain winding drum; of means for rotating said drum; a ratchet wheel rotatable with said last named means; a locking pawl above said ratchet wheel, said pawl having a tooth engageable with said ratchet wheel; pivot means on which said pawl is slidable and swingable, said pivot means supporting the pawl for pivotal ratcheting action with respect to said wheel; and manually operated means for controlling pivotal and sliding movement of said pawl.

3. In a hand brake mechanism, the combination with a chain winding drum; of means for rotating said drum; a ratchet wheel rotatable with said last named means; a locking pawl above said ratchet wheel, said pawl having toothed engagement with said ratchet wheel; pivot means with respect to which said pawl is slidable and on which it is swingable for ratcheting action; a rotary cam member engaging said pawl to positively slide and rock the same on its pivot; and a manually operated lever for rotating said cam member.

4. In a hand brake mechanism, the combination with a chain winding drum; of means for rotating said drum; a ratchet wheel rotatable with said last named means; a locking pawl above said ratchet wheel, said pawl having toothed engagement with the ratchet wheel; a fixed pivot pin for said pawl on which said pawl has sliding and rotary movement; and cam means for sliding and rotating said pawl on said pivot pin.

5. In a hand brake mechanism, the combination with a chain winding drum; of means for rotating said drum; a ratchet wheel rotatable with said last named means; a locking pawl above said ratchet wheel, said pawl having toothed engagement with said ratchet wheel, said pawl being pivoted at one end, said pivotal end being slotted; a pivot pin engaged through said slot and pivotally and slidingly supporting said pawl; and manually actuated cam means for sliding and rocking said pawl on said pivot pin.

6. In a hand brake mechanism, the combination with a chain winding drum; of means for rotating said drum; a ratchet wheel rotatable with said last named means; a locking pawl above said ratchet wheel, said pawl having a toothed portion in engagement with said ratchet wheel, said pawl having a yoke section at said tooth portion and a slot remote from said yoke section; a supporting pivot pin extending through said slot; a rotary cam member engaged within said yoke for sliding and swinging said pawl on its pivot; and manually operated means for actuating said cam member.

7. In a hand brake mechanism, the combination with a chain winding drum; of means for rotating said drum; a ratchet wheel rotatable with said last named means; a locking pawl above said ratchet wheel, said pawl having a slot at one end, and a yoke at the other end, said pawl having toothed engagement with said ratchet wheel at said yoke end; a pivot pin supporting said pawl, said pin extending through said slot and said pawl being slidable and rotatable on said pin; a rotary cam engaged within said yoke for sliding and rotating said pawl on said pin; and an operating handle lever for oscillating said cam.

8. In a hand brake mechanism, the combination with a chain winding drum; of means for rotating said drum; a ratchet wheel rotatable with said last named means; a locking pawl engaged with said ratchet wheel for holding the drum against rotation in chain unwinding direction; a pivotal support on which the pawl is swingable to permit ratcheting action; and means for displacing said pawl in the direction of its length toward the axis of its pivotal movement on said support while in engagement with the latter and said ratchet wheel to ease off the brakes.

9. In a hand brake mechanism, the combination with a chain winding drum; of means for rotating said drum; a ratchet wheel rotatable with said last named means; a locking pawl engageable with said ratchet wheel for holding the drum against rotation in chain unwinding direction; a pivot on which said pawl is swingable for rocking ratcheting action, said pawl being slidable in the direction of its length with respect to said pivot; and manually operated cam means constantly engaged with said pawl for sliding the latter with respect to said pivot in said lengthwise direction tangentially with respect to the ratchet wheel while engaged with the latter to ease off the brakes.

10. In a hand brake mechanism, the combination with a chain winding drum; of means for rotating said drum; a ratchet wheel rotatable with said last named means; a locking pawl; a pivot for supporting said pawl for pivotal movement, said pawl being slidable with respect to said pivot and engageable with the ratchet wheel for holding the drum against rotation in chain unwinding direction; and manually operated rotary cam means operatively engaging said pawl for sliding the same in the direction of its length, tangentially of said ratchet wheel and with respect to said pivot while engaged with said wheel to ease off the brakes, said cam means having a cam portion operative to swing said pawl on its pivot, away from said ratchet wheel, to disengage the same after easing off of the brakes.

11. In a hand brake mechanism, the combination with a chain winding drum; of means for rotating said drum; a ratchet wheel rotatable with said last named means; a locking pawl supported for pivotal and sliding movement, said pawl being engageable with the ratchet wheel for holding the drum against rotation in chain unwinding direction; and manually operated, oscillatory, cam means for sliding said pawl on its pivot, in reverse directions while engaged with said ratchet wheel to respectively ease off and tighten the brakes.

12. In a hand brake mechanism, the combination with a chain winding drum; of means for rotating said drum; a ratchet wheel rotatable with said last named means; a locking pawl supported for pivotal and sliding movement, said pawl being engageable with the ratchet wheel for holding the drum against rotation in chain unwinding direction; an oscillatory cam member for sliding said pawl in reverse directions while engaged with said ratchet wheel and swinging said pawl toward and away from said ratchet wheel respectively prior and subsequent to said sliding movement to respectively engage said pawl with and disengage the same from said ratchet wheel.

13. In a hand brake mechanism, the combination with a chain winding drum; of means for rotating said drum; a ratchet wheel rotatable with said last named means; a locking pawl co-operating with said ratchet wheel; pivotal means supporting said pawl for pivotal and sliding movement with respect to its pivotal support; manually operated cam means for sliding said pawl with respect to and swinging the same on its pivot; means engageable with said pawl for positively forcing the same against said ratchet wheel; and manually operated means for actuating both said last named means and the cam means.

14. In a hand brake mechanism, the combination with a chain winding drum; of means for rotating said drum; a ratchet wheel rotatable with said last named means; a support; a locking pawl having a pivotal connection with said support and being slidable and rockable on said pivotal connection, said pawl having ratcheting engagement with said ratchet wheel; and manually operated means in constant operative engagement with said pawl and movable in reverse directions for reciprocating the pawl on its pivot in lengthwise sliding direction and lifting the pawl clear of the ratchet wheel when moved to extreme position in one direction.

ROLAND J. OLANDER.